No. 782,464. PATENTED FEB. 14, 1905.
W. PERDUE.
PUZZLE.
APPLICATION FILED MAY 11, 1904.
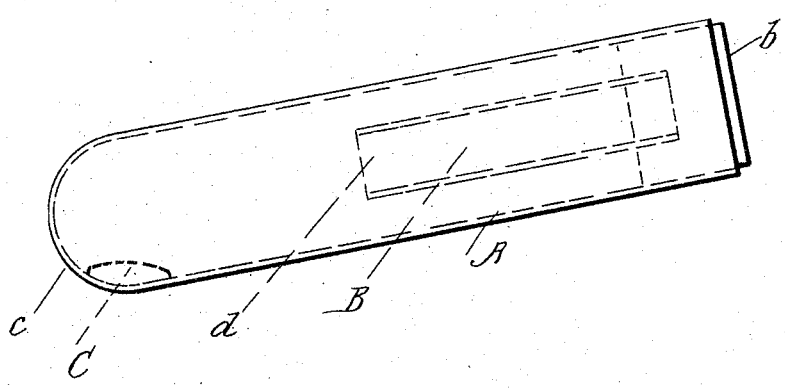
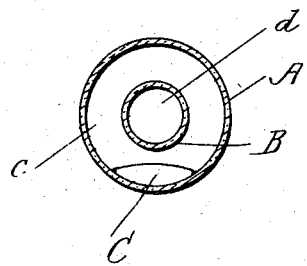

No. 782,464.                                                        Patented February 14, 1905.

UNITED STATES PATENT OFFICE.

WALTER PERDUE, OF WINTHROP, MASSACHUSETTS.

PUZZLE.

SPECIFICATION forming part of Letters Patent No. 782,464, dated February 14, 1905.

Application filed May 11, 1904. Serial No. 207,388.

*To all whom it may concern:*

Be it known that I, WALTER PERDUE, a citizen of the United States, residing at Winthrop, in the county of Suffolk and State of Massachusetts, have invented certain new and useful Improvements in Puzzles; and I do hereby declare the following to be a full, clear, and exact description of the invention, such as will enable others skilled in the art to which it appertains to make and use the same.

This invention relates to puzzles; and it consists in the novel construction and combination of the parts hereinafter fully described and claimed.

In the drawings, Figure 1 is a side view of the device. Fig. 2 is a cross-section through the device.

A is a tube of glass or other transparent material which is closed at one end by a stopper of cement, $b$, or other suitable material. The other end, $c$, of this tube is concavo-convex.

B is a short tube of glass or other approved material, which is smaller in diameter than the tube A. One end of the tube B is inserted in the stopper $b$ and is closed by the said stopper. The other end, $d$, of the tube B is open, and the tube B is preferably arranged centrally of the tube A and parallel with it. The tube B projects within the tube A for about one-half of the length of the tube A.

C is a globule of mercury or quicksilver, which is placed inside the tube A.

The puzzle is to transfer the globule of mercury from the tube A to the tube B. When the tubes are held in the position shown in Fig. 1, the globule of mercury is at the end $c$ of the tube A, and by a very dexterous jerk it can be tossed into the open end of the tube B.

What I claim is—

In a puzzle, the combination, with a straight and cylindrical outer tube having a hemispherical closed end, and a stopper which closes the other end of the said tube; of an inner straight and cylindrical tube which projects from the said stopper concentric with the said outer tube and for substantially one-half of its internal space, and a globule of mercury in the said outer tube.

In testimony whereof I affix my signature in presence of two witnesses.

WALTER PERDUE.

Witnesses:
ROBERT WILLIAM ONYONS,
H. FREEMAN DAGGETT.